United States Patent
Sutherland

(10) Patent No.: US 6,637,393 B2
(45) Date of Patent: Oct. 28, 2003

(54) HCCI ENGINE COMBUSTION CONTROL APPARATUS AND METHOD

(75) Inventor: Don Randolph Sutherland, Romeo, MI (US)

(73) Assignee: General Motors Corporation, Detroit, MI (US)

( * ) Notice: Subject to any disclaimer, the term of this patent is extended or adjusted under 35 U.S.C. 154(b) by 67 days.

(21) Appl. No.: 10/056,379

(22) Filed: Jan. 24, 2002

(65) Prior Publication Data

US 2003/0136367 A1 Jul. 24, 2003

(51) Int. Cl.[7] .................................................. F02P 9/00
(52) U.S. Cl. .............................. 123/145 A; 123/143 R; 123/430
(58) Field of Search ................................ 123/295, 298, 123/145 A, 430, 143 R

(56) References Cited

U.S. PATENT DOCUMENTS

| | | | |
|---|---|---|---|
| 4,589,398 A | 5/1986 | Pate et al. | 123/596 |
| 4,768,481 A * | 9/1988 | Wood | 123/254 |
| 5,027,764 A | 7/1991 | Reimann | 123/143 |
| 5,060,609 A * | 10/1991 | Merritt | 123/256 |
| 5,476,072 A | 12/1995 | Inventor | 123/48 |
| 5,535,716 A | 7/1996 | Sato et al. | 123/279 |
| 5,832,880 A | 11/1998 | Dickey | 123/25 |
| 5,875,743 A | 3/1999 | Dickey | 123/25 |
| 6,095,102 A | 8/2000 | Willi et al. | 123/27 |
| 6,257,199 B1 | 7/2001 | Kanda et al. | 123/298 |
| 6,263,855 B1 | 7/2001 | Kobayashi et al. | 123/295 |
| 6,396,028 B1 * | 5/2002 | Radmacher | 123/145 A |

FOREIGN PATENT DOCUMENTS

| | | |
|---|---|---|
| EP | 0434217 B1 | 11/1990 |
| WO | WO 01/11233 | 2/2001 |

* cited by examiner

Primary Examiner—Thomas N. Moulis
(74) Attorney, Agent, or Firm—Kathryn A. Marra

(57) ABSTRACT

Compression ignition of a homogeneous air fuel charge in a piston engine is controlled over a substantial range of lean to stoichiometric air fuel ratios by supplying additional heat as required to an open sided hot spot recess in a combustion chamber. A surface electric heater element is controlled in response to sensed engine operating conditions to provide additional heat as required to ignite the charge compressed in the hot spot to initiate combustion that progresses through the open side of the hot spot recess and completes combustion of the cylinder charge in the time interval required for efficient combustion. Matching of the hot spot energy requirements to the cylinder operating conditions of each engine embodiment and the manner of controlling energy transfer must be developed for each engine application to obtain the full benefit of unthrottled combustion of homogenious mixtures over a major portion of an engine operating range.

7 Claims, 1 Drawing Sheet

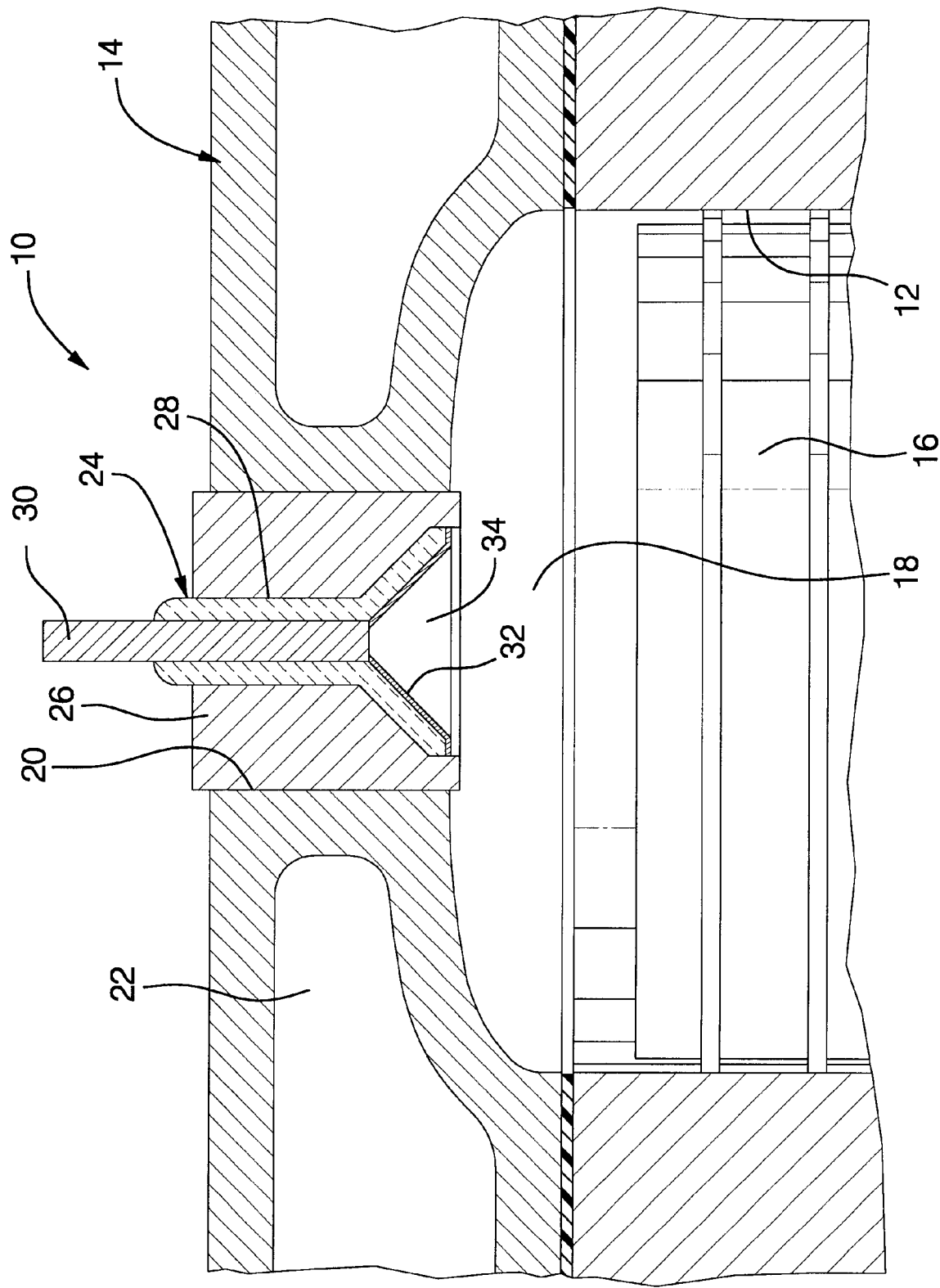

HCCI ENGINE COMBUSTION CONTROL APPARATUS AND METHOD

TECHNICAL FIELD

This invention relates to homogeneous charge compression ignition engines and more particularly to a method and means for controlling ignition timing and combustion rate in such engines.

BACKGROUND OF THE INVENTION

Conventional homogeneous charge engines, as are extensively used in automotive vehicles, generally operate with spark ignition of a homogeneous charge of essentially stoiciometric air/fuel ratio with load control accomplished primarily by throttling of the charge, which reduces efficiency of the engine by creating additional pumping work. Conventional compression ignition, or diesel, engines on the other hand generally operate unthrottled and control the load or power output of the engine by varying the amount of fuel injected into the combustion chamber at the time at which ignition is desired to begin. While diesel engines have greater efficiency, they tend to emit higher concentrations of oxides of nitrogen (NOx) and particulate matter (PM) resulting from the combustion process.

A third method of combustion known as homogeneous charge compression ignition (HCCI) has some potential to significantly reduce NOx and PM emissions due to the homogeneous mixture of fuel and air providing a uniformly dispersed lean fuel mixture before the start of combustion near the end of each compression stroke of the engine. However, it has proved difficult to operate an engine in an HCCI mode over a wide speed and load range. Thus, at present, various combinations of conventional compression ignition combustion with HCCI combustion applied in different portions of an engine operating range are being considered for providing a fully operational engine operating method.

SUMMARY OF THE INVENTION

The present invention provides a method and apparatus for extending the practical range of operation of an engine with HCCI combustion, with the possibility of operating such an engine in the HCCI mode over a full operating load range and at least of extending the operating range of HCCI combustion in dual mode engine operation.

The method of the invention involves providing a controllable heater in the engine combustion chamber in a quiescent portion formed, for example, by a hot spot or recess in the chamber. The recess must be large enough and the heater surface and temperature great enough to provide for heating a segregated or quiescent portion of the charge to a proper temperature for ignition at a desired time of the engine cycle. The ignited charge must have sufficient mass to initiate flame combustion of the remainder of the charge through an open side of the hot spot or recess to obtain substantially complete combustion of the homogeneous charge. To operate the engine over a range of lean mixtures with unthrottled homogeneous charge CI combustion, the temperature of the heater and the temperature reached in the hot spot must be variable as necessary to obtain the proper ignition timing for burning the lean mixture in the cylinder over the full range of operating conditions of the engine and with load control provided by controlling the amount of fuel introduced into the unthrottled air charge of the cylinder.

In a preferred embodiment, the invention involves a combustion chamber hot spot recess, formed for example as a cone or other desired shape, having an open side to the combustion chamber and a relatively large surface within the recess on which a heater element is formed as a thin film or latticework of conductive resistance material. The heater element operates by resistance heating of the film when subjected to an electrical voltage. The conductive resistance heating material may be applied to an insulator which isolates the surface electrically from the combustion chamber walls. However, the heater support should also be partially thermally conductive to a cooled wall of the combustion chamber so that the element may be quickly cooled when the heat required is reduced or the heater is turned off completely. Thus, control of the temperature of the heater in the recess, which provides a variable temperature hot spot, may be effective to vary the energy applied to air fuel charges of varying degrees of leanness so as to provide the desired timing and combustion rate of the homogeneous charges supplied to the combustion chamber under the various operating conditions of the engine.

These and other features and advantages of the invention will be more fully understood from the following description of certain specific embodiments of the invention taken together with the accompanying drawings.

BRIEF DESCRIPTION OF THE DRAWINGS

The single FIGURE of the drawing is a cross-sectional view showing the combustion chamber defining portion of a single cylinder of an engine formed in accordance with the invention.

DESCRIPTION OF THE PREFERRED EMBODIMENT

In the drawing, numeral 10 generally indicates a portion of an engine including a cylinder 12 closed at one end by a cylinder head 14. The cylinder carries a reciprocable piston 16 which defines with the cylinder and cylinder head a combustion chamber 18 that varies in volume with the movement of the piston. Conventional intake and exhaust valves, or other charge intake and exhaust means not shown, are provided for admitting air fuel mixtures to the combustion chamber and discharging combustion products therefrom.

In accordance with the invention, the engine further includes an opening 20 extending through the cylinder head and in heat exchange relation with coolant passages 22 or other cooling portions of the cylinder head. Within the opening there is mounted a combustion control device 24 formed as a heater assembly including a thermally conductive body 26 supporting an electric insulator 28 having some thermal conductance. The insulator 28 includes cylindrical and conical portions with an electrode 30 extending through the cylindrical portion and a heater element 32 applied to the inner surface of the conical portion.

The conical portion of the insulator surrounds a hot spot recess 34 having its lower end open to the combustion chamber 18 and defining a semi-enclosed volume recessed from the combustion chamber, preferably in a relatively quiescent portion of the combustion chamber as regards movement of the charge during operation of the engine.

The heater element 32 may be formed for example as a thin metallic coating on the interior surface of the conical recessed portion of the insulator. Alternatively, if desired, the heater element could involve wires or interlaced conductors applied against the conical inner surface of the insulator. In any case, the heater element is exposed to the recessed hot spot 34 which is in turn open to the combustion chamber through the large open end of the insulator.

The heater element is electrically connected to the electrode 30 at the small end of the conical surface and is grounded to the body 26 at the large end of the conical surface. Alternatively a separate return conductor could be provided instead of grounding the heater element directly to the cylinder head.

The heater element is thermally connected with a cooled wall of the cylinder head 14 by heat conduction through the insulator 28 and conductive body 26 so that the heater element may be cooled by conduction of heat to the engine coolant in passages 22 for a purpose to be subsequently described.

The heater element 32 is connected in an electrical circuit of a vehicle electrical system or, if necessary, a separate higher voltage system for supplying electrical energy through the electrode 30 to the heater element and back to the negative side of the electrical system through the body 26 and/or the cylinder head 14. Electrode 30 connects with a controller, not shown, which may be operated by the vehicle electronic control module in order to vary the temperature of the heater as required for the varying operating conditions of the engine.

The engine is designed to operate to the extent possible on a homogeneous charge compression ignition (HCCI) combustion mode, wherein a homogeneous air fuel charge is drawn into the cylinder, or formed within the cylinder, on the piston intake stroke. The homogeneous charge is subsequently compressed on the compression stroke to the point where ignition occurs due to increased temperature of the charge as it is compressed to ignition temperature near the end of the compression stroke. Ignition is timed to provide continuing combustion and completion thereof within a desired period of piston motion near its top dead center position.

The engine should be designed to provide for compression ignition of the charge without substantial additional heating when operating at a full power condition in which the air fuel mixture is sufficiently rich for auto ignition under maximum load and temperature conditions. In other operating conditions, such as starting or at lower operating temperatures or where the mixture is made increasingly lean in order to reduce power developed by the engine, the cylinder charge will be ignited by a portion of the mixture that is heated to a higher temperature than the rest of the charge.

This is accomplished by energizing the heater element 32 and heating the charge that is compressed into the recess 34 to a temperature reached during the compression stroke that is sufficient to initiate combustion within the recess at the desired timing in the compression stroke and with sufficient energy to propagate combustion from the hot spot 34 into the main combustion chamber 18 and complete the combustion within the desired portion of the piston motion near its top dead center position. To properly heat the hot spot charge during the time allowed in the piston compression stroke requires control of the heater element temperature and containment of the compressed charge within the hot spot recess during the piston compression stroke. In this way, a desired increase in temperature sufficient to ignite the mixture under a considerable variation of load conditions of the engine is able to be reached.

Accordingly, a method of controlling combustion of a homogeneous air fuel charge in a variable volume combustion chamber of a piston engine operated on the HCCI combustion mode comprises:

Providing a hot spot recess in a wall of the combustion chamber, the recess having a substantial wall area with a side in open communication with remainder of the combustion chamber.

Providing a controllable heater element on a major portion of the recess wall area.

Cyclically compressing varying lean homogeneous air fuel mixtures in the combustion chamber for ignition and burning and Variably controlling the average temperature of the heating element to heat a portion of the variably lean mixtures compressed in the hot spot recess to compression ignition temperature at a desired ignition timing with the release of sufficient energy to continue combustion of the lean mixtures to completion during repetitive expansions of the combustion chamber.

The basis for development of the present invention is the recognition that by providing a hot spot of sufficient size and proper location and a heater element with a substantial range of temperature output, controllable between maximum and zero heating conditions, the concept of temperature inhomogeneity can be utilized as the primary mechanism for initiating and controlling combustion in a combustion chamber wherein air fuel mixtures of varying ignitability are admitted for varying the power output of the engine. HCCI combustion is a chain reaction involving initiation, propagation, and termination steps. The time required to initiate the reaction is a function of temperature. If it is hot enough, the combustible mixture initiates and burns quickly. If it is slightly cooler, the mixture takes a longer time to begin burning as well as to complete combustion. If it is too cold it will never ignite.

Commonly the compressed charge temperature in a compression ignition engine results from the initial charge temperature being increased by the heat of compression. However, when increasingly weaker air fuel mixtures are provided at lower power outputs, additional heat must be provided to the cylinder charge in order to ignite the weaker charges and initiate their continuing combustion. Thus, the hot spot of the present invention is provided as a device for accomplishing this purpose and is made sufficiently large and with a recess shaped as necessary to contain the compressed charge long enough to be heated to the desired temperature. The amount of heat required is primarily a function of the air/fuel ratio, the charge temperature and the residuals. All of these are measurable or estimatable so that combustion can be controlled by an electronic control programmed to accomplish the desired tasks by properly controlling the heater element of the present invention.

It should be understood that the form of the heater element illustrated as well as the form and location of the recess in which the heater element is provided are capable of being changed in design as needed to adapt the present invention to a particular engine and/or combustion chamber embodiment. Additionally the particular materials used and the form of insulators and heater materials may be varied as desired to accomplish the disclosed purposes.

In the preferred embodiment, the heater element is connected to a cooled wall of cylinder head to quickly lower the element temperature when the element is de-energized. To assure the transfer of energy from the ignited charge in the hot spot recess to the rest of the combustion chamber, the width of the recess opening may be made larger than the depth of the hot spot recess. A cone shaped recess is suggested, but not required, for this purpose.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. Apparatus for controlling compression ignition of a homogeneous air fuel charge in a piston engine, the apparatus comprising:

a variable volume combustion chamber defined in part by a movable piston having compression and expansion motions;

means for providing a homogeneous air fuel mixture in the combustion chamber prior to completion of the piston compression motion;

a defined volume forming a portion of the combustion chamber defined by a recess having a substantial wall area and a side in open communication with the remainder of the chamber; and a heater element disposed on a major portion of the recess wall area and forming a hot spot in the recess capable of variably heating compressed air fuel mixtures therein to controlled temperatures able to initiate compression ignition of the variable lean mixtures in the hot spot and to complete combustion of the lean mixtures in the combustion chamber over a wide range of lean combustion conditions.

2. Apparatus as in claim 1 wherein the heater element is in heat exchange communication with a cooled wall of the combustion chamber to quickly reduce the heater element temperature when the heater element is de-energized.

3. Apparatus as in claim 1 wherein the width of the hot spot recess is greater than its the depth.

4. Apparatus as in claim 1 wherein the heater element comprises an electrically resistive film applied on the surface of an insulator substantially forming the recess.

5. Apparatus as in claim 1 wherein recess has the form of a shallow cone with a base open to the combustion chamber.

6. A method of controlling combustion of a homogeneous air fuel charge in a variable volume combustion chamber of a piston engine, the method comprising providing a hot spot recess in a wall of the combustion chamber, the recess having a substantial wall area with a side in open communication with the remainder of the combustion chamber providing a controllable heater element on a major portion of the recess wall area;

cyclically compressing varying lean homogeneous air fuel mixtures in the combustion chamber for ignition and burning; and variably controlling the average temperature of the heating element at a level to heat a portion of the varying lean mixtures compressed into the hot spot recess to compression ignition temperature at a desired ignition timing with the release of sufficient energy to continue combustion of the lean mixtures to completion during repetitive expansions of the combustion chamber.

7. A method as in claim 6 including de-energizing the heater element when the charge temperature becomes sufficient to initiate combustion of air fuel mixtures in the combustion chamber without additional heating.

* * * * *